United States Patent [19]

Hsieh et al.

[11] 3,764,639

[45] Oct. 9, 1973

[54] BLOCK COPOLYMERS OF CONJUGATED DIENES AND LACTONES

[75] Inventors: Henry L. Hsieh; Francis X. Mueller, Jr.; William R. Busler, all of Bartlesville, Okla.

[73] Assignee: Phillips Petroleum Company, Bartlesville, Okla.

[22] Filed: Feb. 16, 1971

[21] Appl. No.: 115,793

Related U.S. Application Data

[63] Continuation of Ser. No. 679,978, Nov. 2, 1967, abandoned.

[52] U.S. Cl. ............ 260/880 B, 260/874, 260/879, 260/887
[51] Int. Cl. ..................... C08f 19/06, C08f 25/00
[58] Field of Search ................ 260/880 B, 874, 887

[56] References Cited
UNITED STATES PATENTS 3,029,221  4/1962  Welch .............................. 260/874
3,169,945  2/1965  Hostettler et al. ................... 260/874
3,225,121  12/1965  Baker ................................ 260/874
3,231,635  1/1966  Holden .............................. 260/880
3,418,393  12/1968  King ................................. 260/874
3,557,255  1/1971  Sharkey ............................ 260/880

FOREIGN PATENTS OR APPLICATIONS 676,222  12/1963  Canada ............................. 260/78.3

OTHER PUBLICATIONS

Nobutoki et al., "Bulletin of the Chemical Society of Japan" 40 (8) pp. 1741–1745, 1967

Primary Examiner—James A. Seidleck
Attorney—Young and Quigg

[57] ABSTRACT

Block copolymers formed from a conjugated diene or monovinyl substituted aromatic compound and a lactone using a lithium-containing catalyst.

22 Claims, No Drawings

BLOCK COPOLYMERS OF CONJUGATED DIENES AND LACTONES

This application is a continuation of application Ser. No. 679,978, filed on Nov. 2, 1967, now abandoned.

This invention relates to a new and improved block copolymer and a new and improved method for making same.

Heretofore, block copolymers have been formed using two dissimilar monomers such as a conjugated diene and a monovinyl substituted aromatic compound. By the term "block copolymer" what is meant is a copolymer of two dissimilar monomers, the macromolecules of which are composed of at least two segments, usually linear in structure, joined together in an end-to-end relation, one segment being formed predominantly of one monomer and another segment being formed predominantly of another, dissimilar, monomer. For example, if two dissimilar monomers A and B are employed in making the block copolymer and the resulting block copolymer contains two segments, a macromolecule of this copolymer can be represented by the structure: AAAABBBB.

It has now been found that a block copolymer can be formed using at least one lactone as one monomer and at least one of conjugated diene compounds and monovinyl substituted aromatic compounds as the other monomer, and employing lithium based compounds as the initiator (catalyst).

Therefore, this invention relates to a block copolymer wherein the macromolecules which make up that copolymer contain at least two segments joined in an end-to-end relationship, at least one segment being formed predominantly of a monomer or monomers from one of the two monomer classes, i.e. lactones or conjugated dienes and/or monovinyl substituted aromatic compounds, and at least one other segment, usually linear, being formed predominantly of at least one monomer from the class of monomers not used to form the first mentioned segment. Thus, in the above example where the dissimilar monomers are denoted as A and B, a copolymer within the scope of this invention can be represented structurally by substituting one or more lactones for the A and one or more conjugated dienes and/or monovinyl substituted aromatic compounds for the B or vice versa.

This invention also relates to a method for making the block copolymers wherein the monomer or monomers from the class of conjugated dienes and monovinyl substituted aromatic compounds are first polymerized a finite amount, preferably from about 1 to about 100 percent conversion of the monomer or monomers, using a lithium-containing catalyst and thereafter adding to this polymerization reaction mixture after the finite amount of polymerization has been carried out at least one lactone and continuing the polymerization until the finite amount, i.e. from about 1 to about 100 percent conversion, of the lactone or lactones have been polymerized.

This method provides a block copolymer wherein a polymer block of conjugated dienes or monovinyl substituted aromatic compounds has attached thereto a polymer block derived from the lactone. Depending on the type of lithium initiator employed, the polymer block of conjugated diene or monovinyl substituted aromatic compounds can have the polymer segment derived from the lactone attached to only one end of the polymer of the first polymerized monomer or monomers, or it can have the lactone polymer segment attached to the terminal ends of the first polymerized monomer or monomers segment. Therefore, the block copolymers of the invention can be characterized as falling into three distinct classes: (1) a block copolymer of two different polymer segments; (2) a block copolymer of three different polymer segments; or (3) a block copolymer of three different polymer segments wherein the central block is a polymer of a conjugated diene or monovinyl substituted aromatic compound and the terminal blocks are polymer blocks derived from the lactone. An example of the first type of block copolymer is a poly(conjugated diene)-poly(lactone) polymer. An example of the second type of block copolymer is a poly(monovinyl substituted aromatic compound)-poly(conjugated diene)-poly(lactone). An example of the third type of block copolymer is a poly(lactone)-poly(conjugated diene)-poly(lactone).

The block copolymers of this invention are moldable materials which can be compounded and cured and can vary in overall properties from elastomeric to plastic. The block copolymers of this invention are tough and leather-like in character and can be used in many applications in both the rubber and plastics fields. The block copolymers of this invention can be used to make fibers and film. For example, the block copolymers of this invention can be formed into a tough, leather-like film useful as a packaging material and into floor mats, rubber hose, bottles, bowls, and the like.

Accordingly, it is an object of this invention to provide a new and improved block copolymer.

It is another object of this invention to provide a new and improved method for making block copolymers.

Other aspects, objects, and advantages of this invention will be apparent to those skilled in the art from the description and appended claims.

Lactones that can be employed in this invention can be represented by the formula

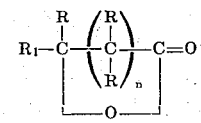

wherein $R_1$ is one of hydrogen and a radical of the formula

and when $R_1$ is the specified radical, no R is attached to the carbon atom to which the radical is attached, wherein R is one of hydrogen, a saturated aliphatic, a saturated cycloaliphatic, alkenyl, cycloalkenyl, or an aromatic radical, or combinations thereof, wherein n is an integer which can be 1, 3, or 4, and wherein the total number of carbon atoms in the substituents employed, if any, is in the range of 1 to 12, inclusive.

Suitable lactones include beta-propiolactone, delta-valerolactone, epsilon-caprolactone, and lactones of the following acids: 2-methyl-3-hydroxypropionic acid, 3-hydroxynonanoic or 3-hydroxypelargonic acid, 2-dodecyl-3-hydroxypropionic acid, 2-cyclopentyl-3- hydroxypropionic acid, 3-phenyl-3-hydroxypropionic acid, 2-naphthyl-3-hydroxypropionic acid, 2-n-butyl-3-cyclohexyl-3-hydroxypropionic acid, 2-phenyl-3-hydroxytridecanoic acid, 2-methylcyclopentyl-3-hydroxypropionic acid, 2-methylphenyl-3-hydroxypropionic acid, 3-benzyl-3-hydroxypropionic acid, 2,2-dimethyl-3-hydroxypropionic acid, 2-methyl-5-hydroxyvaleric acid, 3-cyclohexyl-5-hydroxyvaleric acid, 4-phenyl-5-hydroxyvaleric acid, 2-heptyl-4-cyclopentyl-5-hydroxyvaleric acid, 2-methyl-3-phenyl-5-hydroxyvaleric acid, 3-ethylcyclohexyl-5-hydroxyvaleric acid, 4-benzyl-5-hydroxyvaleric acid, 3-ethyl-5-isopropyl-6-hydroxycaproic acid, 2-cyclopentyl-4-hexyl-6-hydroxycaproic acid, 3-phenyl-6-hydroxycaproic acid, 3-(3,5-diethylcyclohexyl)-5-ethyl-6-hydroxycaproic acid, 4-propylphenyl-6-hydroxycaproic acid, 2-benzyl-5-isobutyl-6-hydroxycaproic acid, 2,2,4-trimethyl-3-hydroxy-3-pentenoic acid, 2-phenyl-6-hydroxy-6-octenoic acid, 2,2-di(1-cyclohexyl)-5-hydroxy-5-heptenoic acid, 2,2-dipropenyl-5-hydroxy-5-heptenoic acid, and the like. Mixtures of two or more of the above lactones can be employed.

The lactone class represents one of the dissimilar monomers employed in this invention. As explained in more detail in the Examples, infra, the polymerization of the lactones as defined above by use of the lithium catalysts defined hereinafter results in the opening of the lactone ring to provide a block polymer segment having a polyester structure. The other class of dissimilar monomers employed is the group of conjugated dienes and monovinyl substituted aromatic compounds.

Conjugated dienes that can be employed in this invention are those containing 4 to 12 carbon atoms per molecule, inclusive, for example, 1,3-butadiene, isoprene, 1,3-pentadiene(piperylene), 1,3-hexadiene, 2,3-dimethyl-1,3-butadiene, 1,3-octadiene, 4-ethyl-1,3-hexadiene, 4-phenyl-1,3-butadiene, 6-phenyl-1,3-hexadiene, and the like including mixtures of two or more of these dienes. Preferred conjugated dienes are butadiene, isoprene, and piperylene.

Monovinyl substituted aromatic compounds that can be employed in this invention are those containing from 8 to 12 carbon atoms per molecule, inclusive, for example, styrene, 3-methylstyrene, 4-methylstyrene, 4-isopropylstyrene, 2,4-dimethylstyrene, 1-vinylnaphthalene, 2-vinylnaphthalene, and the like including mixtures thereof. Preferred monovinyl substituted aromatic compound is styrene.

It is also within the scope of this invention to employ mixtures of conjugated dienes and monovinyl substituted aromatic compounds, for example mixtures of butadiene and styrene, isoprene and styrene, butadiene, isoprene and styrene, and the like.

The initiators employed in this invention can be any known lithium-containing initiator. Preferred initiators are those which correspond to the general formula R'(Li)$_x$, wherein R' is a hydrocarbon radical selected from the group consisting of aliphatic, cycloaliphatic, and aromatic radicals and combinations thereof, and $x$ is an integer from 1 to 4, inclusive. The R' group has a valence equal to the integer $x$ and preferably contain from 1 to 20, inclusive, carbon atoms, although it is possible to use high molecular weight compounds. Examples of suitable lithium-containing compounds within the scope of the above formula include methyllithium, isopropyllithium, n-butyllithium, tert-octyllithium, n-decyllithium, phenyllithium, naphthyllithium, 4butylphenyllithium, p-tolyllithium, 4-phenylbutyllithium, cyclohexyllithium, 4-butylcyclohexyllithium, 4-cyclohexylbutyllithium, dilithiomethane, 1,4-dilithiobutane, 1,10-dilithiodecane, 1,20-dilithioeicosane, 1,4-dilithiocyclohexane, 1,4-dilithio-2-butene, 1,8-dilithio-3-decene, 1,4-dilithiobenzene, 1,5-dilithionaphthalene, 1,2-dilithio-1,2-diphenylethane, 1,5-dilithioanthracene, 1,2-dilithio-1,8-diphenyloctane, 1,3,5-trilithiopentane, 1,5,15-trilithioeicosane, 1,3,5-trilithiocyclohexane, 1,2,5-trilithionaphthalene, 1,3,5-trilithioanthracene, 1,3,5,8-tetralithiodecane, 1,5,10,20-tetralithioeicosane, 1,2,3,5-tetralithiocyclohexane, 1,2,3,5-tetralithio-4-hexylanthracene, and the like. Other preferred catalyst include reaction products between the compounds of the formula R'(Li)$_x$ as disclosed hereinabove and one of a divinylaromatic or a trivinylaromatic compound containing 1 or 2 benzene rings of alkyl substituted benzene rings, the total of the alkyl substituents on any di- or trivinylaromatic compound not exceeding 12 carbon atoms. Examples of suitable vinylaromatic compounds for reaction with the organolithium catalyst include divinylbenzene, trivinylnaphthylene, divinylbiphenyl, and the like.

In the preparation of the block copolymers of the invention wherein three different polymer segments are produced, one being a central polymer block of conjugated diene or monovinyl aromatic compound and the other blocks being a polymer segment derived from the lactone, those lithium initiators which contain more than one active lithium atom per molecule are suitable. These catalysts provide a central polymer segment of the conjugated diene or monovinyl aromatic compound having attached to the terminal ends of the polymer segment an active Li atom. Catalysts such as the reaction product of lithium with methylnaphthalene and isoprene, followed by solubilizing the reaction product with butadiene (LIMI-B) and catalysts such as a lithium-stilbene adduct are suitable.

When preparing the block copolymers of this invention, the catalyst level for the polymerization of the conjugated diene and/or monovinyl substituted aromatic compound can vary widely but is generally in the range of from about 1 to about 20, preferably from about 2 to about 10, gram millimoles per 100 grams of total monomers to be polymerized, i.e. all the conjugated diene and/or monovinyl substituted aromatic monomers as well as all the lactone monomers. The catalyst level is generally not changed when the conjugated dienes and/or monovinyl substituted aromatic compounds have been polymerized to the desired extent and the lactone or lactones are added for polymerization. Thus, the catalyst level for the polymerization of the conjugated diene and/or monovinyl substituted aromatic compound is generally the catalyst for the entire polymerization process. Generally, the amount of initiator or initiators used in making the block copolymer of this invention will be that which is sufficient to effect the polymerization of substantially all monomers charged, be they charged at the same time or in sequence one after the other.

The amount of each dissimilar monomer employed in making the block copolymers and therefore to comprise the final block copolymers of this invention can vary widely but generally the amount of conjugated diene and/or monovinyl substituted aromatic compound will be in the range of from about 1 to about 99 weight percent while the amount of lactone employed will also be in the range of from about 1 to about 99 weight percent, both weight percentages being based on the total weight of the total monomers (conjugated dienes and/or monovinyl substituted aromatic compounds and lactones) employed in the polymerization process. When a monovinyl substituted aromatic compound or compounds are employed in admixture with one or more conjugated dienes, said mixture can employ the components thereof in any desired weight percent ratio.

When preparing the block copolymers of the invention, the polymerization conditions for polymerizing both first and second monomers include a temperature in the range of from about −20° to about 300°F. The pressure is conveniently adjusted at a level sufficient to maintain the polymerization reaction mixture substantially in the liquid phase. The time for polymerization of the first monomer can be from about 1 minute to about 100 hours, and the time for polymerization of the second monomer can be from about 1 minute to about 100 hours. The reaction can be carried out in the presence of a diluent. Paraffins, cycloparaffins, and aromatic hydrocarbons each having from 4 to 10 carbon atoms per molecule inclusive, acyclic and cyclic ethers having 2 to 6 carbon atoms per molecule, inclusive, and mixtures of the above are suitable.

The block copolymers of this invention are prepared by a two-step process wherein the first step is the polymerization of the conjugated diene and/or monovinyl substituted aromatic compound using the lithium-containing catalyst and, optionally, suitable diluent. The polymerization of the monomers is allowed to continue to any desired conversion percentage up to and including 100 percent conversion of the monomers to polymer. After the desired amount of monomer conversion has been reached, all or part of the lactone monomer or monomers can be added to the polymerization reaction mixture and polymerization continued to the desired conversion of the lactone monomer including 100 percent conversion of that monomer to polymer. It is essential that the conjugated diene and/or monovinyl aromatic compound monomer be polymerized first because the conjugated diene and/or monovinyl substituted aromatic compound polymer-Li structure is believed to serve as the catalyst for the polymerization of the lactone monomer whereas if the lactone monomer is polymerized first the lactone polymer-OLi structure does not provide a reactive site for the subsequent polymerization of the conjugated diene and/or monovinyl substituted aromatic compound. Thus, if the lactone monomer is polymerized first the block copolymer cannot be formed.

The block copolymers of this invention can also be prepared in a multi-step process wherein a conjugated diene or monovinyl substituted aromatic compound is polymerized to essentially quantitative conversion using the lithium-containing catalyst. Each succeeding step can then involve the addition of a different conjugated diene or monovinyl substituted aromatic compound which is polymerized to essentially quantitative conversion so that a two-block copolymer is formed before the lactone(s) is added. The addition of a lactone, mixture of lactones, or successive increments of different lactones and polymerization thereof comprises the final step or steps of the multi-step process. Again, it is essential that the conjugated diene or dienes and monovinyl substituted aromatic compound or compounds be polymerized first because of considerations stated above. By the above, after the lactone is polymerized, a copolymer is produced which contains two or more blocks, e.g. a terpolymer containing a polystyrene block, a polybutadiene block, and a polylactone block.

The block copolymers of this invention can be recovered in any conventional manner such as by catalyst deactivation by the addition of alcohol or other known deactivating agents, separation of the polymer from solution such as by vaporization of the diluents thereby leaving the polymeric product, and drying the polymer. The block copolymers can be compounded in any conventional manner with conventional additives such as carbon black, pigments, antioxidants, and other known stabilizers.

EXAMPLE I

A block copolymer with a first block of a homopolymer of butadiene and a second block of a polyester of epsilon-caprolactone was prepared in a two-step process using n-butyllithium as the polymerization catalyst. The recipe was as follows:

TABLE I

| Step 1: | Cyclohexane, parts by weight | 780 |
|---|---|---|
| | 1,3-Butadiene, parts by weight | 50 |
| | n-Butyllithium, mhm * | 5 |
| | Temperature, °F. | 158 |
| | Time, hours | 1 |
| | Conversion, % | 100 |
| Step 2: | Epsilon-caprolactone, parts by weight | 50 |
| | Temperature, °F. | 158 |
| | Time, hours | 24 |
| | Conversion, % | 100 |

* mhm = gram millimoles per 100 grams monomer

Cyclohexane was charged to the reactor first. The reactor was then purged with nitrogen after which the butadiene was added and then the butyllithium. The temperature was adjusted to 158°F. and after 1 hour, polymerization of the butadiene was essentially complete. The reaction mixture was cooled to room temperature, the caprolactone added, the temperature was adjusted to 158°F., and the mixture was agitated for 24 hours during which time the caprolactone polymerized. The mixture was cooled and approximately one part by weight per 100 parts by weight polymer of 2,2'-methylene-bis(4-methyl-6-tert-butylphenol) was added as a 10 weight percent solution of the antioxidant in a mixture of equal parts by volume of isopropyl alcohol and toluene. The polymer was recovered by evaporation of the diluent.

A homopolymer of butadiene, prepared by polymerization of butadiene using n-butyllithium as the initiator, the polybutadiene having a Mooney value of 45 (ML-4 at 212°F.), was blended with poly(epsilon-caprolactone). The blend was prepared using 10 grams of each polymer. The sampls were cut into small pieces, 200 ml of chloroform was added, and the mixture was agitated at 70°C. for 18 hours. All material was dissolved. The solvent was then evaporated.

The poly(epsilon-caprolactone) was prepared as follows:

TABLE II

| Cyclohexane, parts by weight | 780 |
|---|---|
| Epsilon-caprolactone, parts by weight | 100 |
| n-Butyllithium, mhm * | 10 |
| Temperature, °F. | 41 |

| Time, hours | 75 |
| Conversion, % | 100 |

* Same as Table I

A tough, leather-like polymer was obtained by evaporation of the diluent.

Samples of the block copolymer (4 grams each) and also of the polymer blend (5 grams each) were separately treated with 200 ml of acetone by agitating the mixtures about 15 hours at 70°C. Other samples were treated in a similar manner with cyclohexane. The mixtures were cooled to ice temperature and filtered to remove undissolved material. The dissolved material was recovered from the solutions by evaporation of the solvent. The recovered, dissolved material was weighed and the percent extracted was calculated. Results were as follows:

TABLE III

| Sample | Solvent | Per Cent Extracted |
|---|---|---|
| Blend | Acetone | 54 |
| Block copolymer | Acetone | 8.3 |
| Blend | Cyclohexane | 40 |
| Block copolymer | Cyclohexane | 98 |

Polybutadiene is soluble in cyclohexane and poly(epsilon-caprolactone) is soluble in acetone. The data show that there is a substantial and significant difference in solubility characteristics between the blend and block copolymer thereby affirming that there is a basic structural difference in the block copolymer. The filtrate was turbid. This is indicative of the presence of a block copolymer [Ceresa, *Block and Graft Copolymers*, page 140, published by Butterworth and Company, Ltd. (1962)].

EXAMPLE II

Block copolymers were prepared from butadiene and epsilon-caprolactone using a procedure similar to that described in Example I, i.e., the polybutadiene block was prepared first and the epsilon-caprolactone was then added and polymerized. Two runs were made using different butyllithium levels. Each of the polymers was compound in a conventional manner using a gum stock recipe. The stocks were cured 30 minutes at 307°F., and tensile strength and elongation were determined. Polymerization recipes and results were as follows:

TABLE IV

| | 1 | 2 |
|---|---|---|
| Step 1: Cyclohexane, parts by weight | 780 | 780 |
| 1,3-Butadiene, parts by weight | 50 | 50 |
| n-Butyllithium, mhm * | 3 | 4 |
| Temperature, °F. | 158 | 158 |
| Time, hours | 1.5 | 1.5 |
| Conversion, % | 100 | 100 |
| Step 2: Epsilon-Caprolactone, parts by weight | 50 | 50 |
| Temperature, °F. | 158 | 158 |
| Time, hours | 24 | 24 |
| Conversion, % | 100 | 100 |
| Tensile, psi (1) | 1120 | 740 |
| Elongation, % (1) | 430 | 310 |

* Same as Table I
(1) ASTM D 412-62T

The products were leather-like in texture and were also somewhat elastic. The gum stock recipe employed for compounding the polymers was as follows:

TABLE V

| | Parts by Weight |
|---|---|
| Polymer | 100 |
| Zinc oxide | 3 |
| Stearic acid | 2 |
| Sulfur | 1.75 |
| N-cyclohexyl-2-benzothiazolesulfenamide | 1 |

EXAMPLE III

Different ratios of butadiene and epsilon-caprolactone were employed for preparing block copolymers. The procedure was essentially the same as that described in Example I. The solvent was cyclohexane and 780 parts by weight were used per 100 parts by weight of monomers. The n-butyllithium level was 5 mhm (same as Table I). The first step of the process was conducted at 158°F. for 90 minutes. This was for the preparation of the polybutadiene block. After addition of the epsilon-caprolactone, polymerization was continued at 122°F. for 24 hours. Results were as follows:

TABLE VI

| Run | Butadiene, Parts by Wt. | Epsilon-caprolactone, Parts by Wt. | Conversion, % (1) |
|---|---|---|---|
| 1 | 30 | 70 | 78 |
| 2 | 50 | 50 | 94 |
| 3 | 70 | 30 | 89 |

(1) Based on total monomers charged

Block copolymers were formed in all cases. When these stocks are cured in a gum stock recipe, the polymer from run 1 is a leather-like product wherein samples with at least 50 weight percent butadiene content are elastomeric. Products increase in elasticity as the butadiene content is increased.

EXAMPLE IV

Two different dilithium catalysts, one prepared by reacting lithium with methylnaphthalene and isoprene and solubilizing the product with butadiene (LIMI-B) and the other a lithium-stilbene adduct, were employed for preparing block copolymers from butadiene and epsilon-caprolactone. The products contained a central block of polybutadiene and two terminal blocks of poly(epsilon-caprolactone). The polymerization recipes and results were as follows:

TABLE VII

| | 1 | 2 |
|---|---|---|
| Step 1: Cyclohexane, parts by weight | 780 | 780 |
| 1,3-Butadiene, parts by weight | 50 | 50 |
| LIMI-B, mhm * | 6 | — |
| Lithium-stilbene adduct, mhm * | — | 6 |
| Temperature, °F. | 122 | 122 |
| Time, hours | 1.5 | 1.5 |
| Step 2: Tetrahydrofuran, parts by weight | 35 | 35 |
| Epsilon-caprolactone, parts by weight | 50 | 50 |
| Temperature, °F. | 122 | 122 |
| Time, hours | 20 | 20 |
| Conversion, % (1) | 92 | 88 |

(1) Based on total monomers charged
* Same as Table I

The lithium-methylnaphthalene-isoprene adduct solubilized with butadiene was prepared as follows:

TABLE VIII

| Lithium wire, grams | 2 |
| Methylnaphthalene, ml | 14.2 |
| Diethyl ether, ml | 47 |
| Temperature, °F. | −22 |
| Time, hours | 68 |

After the lithium and methylnaphthalene had reacted for 68 hours, the temperature was raised to 41°F., 12 ml of isoprene was added, and the reaction was continued 1 hour. A total of 50 ml of butadiene was added in increments of 10 ml each at 20-minute intervals. The reaction was continued 20 minutes after the last increment was added. Titration of an aliquot of the reaction mixture with 0.1 N HCl showed that it had a molarity of 1.06.

The lithium-stilbene adduct was prepared using the following recipe:

TABLE IX

| | |
|---|---|
| Lithium wire, g. atom | 0.08 |
| trans-Stilbene, mole | 0.03 |
| Diethyl ether, ml | 90 |
| Tetrahydrofuran, ml | 10 |
| Temperature, °F. | 122 |
| Time, hour | 1 |

Molarity of the reaction mixture, determined by titration with 0.1 N HCl, was 0.383.

EXAMPLE V

Homopolymers of butadiene and epsilon-caprolactone were prepared using the same catalyst level in each run. Polymerization recipes were as follows:

TABLE X

| | 1 | 2 |
|---|---|---|
| Cyclohexane, parts by weight | 780 | 780 |
| 1,3-Butadiene, parts by weight | 100 | — |
| Epsilon-caprolactone, parts by weight | — | 100 |
| n-Butyllithium, mhm * | 8 | 8 |
| Temperature, °F. | 158 | 158 |
| Time, hours | 1.5 | 25 |
| Conversion, % | 100 | 100 |

* Same as Table I

When conducting a polymerization, cyclohexane was charged to the reactor first. The reactor was then purged with nitrogen after which the monomer was added and then the butyllithium. Each reaction was terminated by the addition of approximately one part by weight per 100 parts by weight polymer of 2,2'-methylene-bis(4-methyl-6-tert-butylphenol), introduced as a 10 weight percent solution of the antioxidant in a mixture of equal parts by volume of isopropyl alcohol and toluene.

The product from run 1 was a liquid. It was recovered by evaporating the diluent. The polymer was then dried.

The product from run 2 was a solid. As the polymer formed, it precipitated from the reaction mixture. At the conclusion of the polymerization and following addition of the antioxidant, the diluent was poured off and chloroform was added to dissolve and remove the polymer from the reactor. The chloroform was then evaporated and the remaining polymer product was dried. This polymer was a tough, leather-like solid.

These data show that at this catalyst level, a liquid polymer was obtained from the conjugated diene polymerization and a solid polymer was obtained from the lactone polymerization.

A block copolymer was a first block of polybutadiene and a second block of epsilon-caprolactone was prepared according to the invention using n-butyl-lithium as the catalyst. The recipe was as follows:

TABLE XI

| | 3 |
|---|---|
| Step 1: Cyclohexane, parts by weight | 780 |
| 1,3-Butadiene, parts by weight | 50 |
| n-Butyllithium, mhm * | 4 |
| Temperature, °F. | 158 |
| Time, hours | 1.5 |
| Conversion, % | 100 |
| Step 2: Epsilon-Caprolactone, parts by weight | 50 |
| Temperature, °F. | 158 |
| Time, hours | 25 |
| Conversion, % | 100 |

* Same as Table I

The reaction was terminated by addition of antioxidant solution as in runs 1 and 2 and the product was coagulated in isopropyl alcohol, separated, and dried. A white solid, homogeneous in appearance, was obtained.

In this run, the catalyst level was equivalent to 8 mhm for each step, the same as that used for the preparation of each of the polymers in runs 1 and 2. In step 2, the catalyst was polymer-Li instead of butyllithium. This catalyst level produced a liquid polybutadiene block and a solid poly(epsilon-caprolactone) block.

An attempt was made to prepare a solution blend of the products from runs 1 and 2 of Table X. Twenty grams each of the liquid polybutadiene and solid poly(epsilon-caprolactone) were placed in a vessel with 400 ml of chloroform and agitated at 158°F. for 24 hours. This treatment caused both polymers to dissolve. The chloroform was evaporated and the remaining material was dried in an oven. The product had the appearance of a separable mixture of homopolymers with the liquid polybutadiene forming a coating on the surface of the solid poly(epsilon-caprolactone). The product was not a homogeneous material that would give tensile or elongation values much different from the solid poly(epsilon-caprolactone) by itself. The conclusion drawn from this test is that the two polymers were not compatible. This shows that the product resulting from blending procedure of runs 1 and 2 of Table X was entirely different from the block copolymer prepared in run 3 of Table XI.

Since liquid polybutadiene and solid poly(epsilon-caprolactone) were found to be incompatible, a solution blend of rubbery (solid and not liquid) polybutadiene of about 45 Mooney value (ML-4 at 212°F.) and the solid poly(epsilon-caprolactone) of run 2 of Table X was prepared. This rubbery type of polybutadiene was more compatible with the solid poly(epsilon-caprolactone). Fifteen grams of each homopolymer was added to 400 ml of chloroform and the mixture was agitated at 158°F. for 18 hours. Both polymers dissolved as a result of this treatment. The chloroform was evaporated and the blend was dried in an oven. This blend is designated as run 4.

The blend prepared in run 4 and the block copolymer from run 3 of Table XI were compounded in a conventional manner using gum stock recipes. The stocks were cured 30 minutes at 307°F. and tensile strength and elongation were determined. Compound recipes and results of physical tests were as follows:

TABLE XII

| | Block Copolymer Run 3, Table XI | Polymer Blend Run 4 |
|---|---|---|
| Compounding Recipes, Parts by Weight | | |
| Polymer sample | 100 | 100 |
| Zinc oxide | 3 | 3 |
| Stearic acid | 2 | 2 |
| Sulfur | 1.75 | 1.75 |
| N-cyclohexyl-2-benzothiazolesulfenamide | 1.0 | 1.3 |
| Physical Properties | | |
| Tensile, psi (1) | 803 | 530 |
| Elongation, % (1) | 210 | 65 |

(1) As in Example II

These data show that the block copolymer containing a normally liquid polybutadiene as the polybutadiene block has a much higher tensile and elongation than the blend containing a more solid rubbery polybutadiene. It was unexpected to find that the block copolymer containing a normally liquid polybutadiene as the polybutadiene block had higher tensile and elongation than a blend using a more solid rubbery polybutadiene.

The conjugated diene block imparted elastomeric character to the block copolymer and also rendered it vulcanizable. Poly(epsilon-caprolactone) it tough, is not vulcanizable, and will cold draw but does not have the recovery characteristic of elastomers.

EXAMPLE VI

A block copolymer with a first block of a homopolymer of styrene, a second block of a homopolymer of butadiene, and a third block of a polyester of epsilon-caprolactone was prepared in a three-step method using sec-butyllithium as the catalyst. The recipe was as follows:

TABLE XIII

| | | |
|---|---|---|
| Step 1: | Cyclohexane, parts by weight | 780 |
| | Styrene, parts by weight | 25 |
| | sec-Butyllithium, mhm* | 4 |
| | Temperature, °F | 158 |
| | Time, hours | 1 |
| Step 2: | 1,3-Butadiene, parts by weight | 50 |
| | Temperature, °F | 158 |
| | Time, hours | 1.5 |
| Step 3: | Epsilon-caprolactone, parts by wt. | 25 |
| | Temperature, °F | 158 |
| | Time, hours | 24 |

*Same as Table I

The materials were charged in the following order: cyclohexane, styrene, sec-butyllithium, 1,3-butadiene, epsilon-caprolactone. The polymerization was terminated by addition of 1 part by weight per 100 parts by weight polymer of 2,2'-methylene-bis(4-methyl-6-tert-butylphenol) as a 10 weight percent solution of the antioxidant in isopropyl alcohol. The polymer was recovered by coagulation in isopropyl alcohol.

The polymer was solid and tests gave the following results:

TABLE XIV

| | |
|---|---|
| Conversion based on the total weight of all three monomers, % | 91 |
| Tensile, psi (1) | 4240 |
| Elongation, % (1) | 1490 |

(1) ASTM D412-62T

Reasonable variations and modifications are possible within the scope of this disclosure without departing from the spirit and scope thereof.

I claim:

1. A block copolymer of at least two dissimilar monomers, the macromolecules of which consist essentially of at least two different polymer segments joined in an end-to-end relation; one segment consisting essentially of a polymer of at least one conjugated diene having from 4 to 12 carbon atoms per molecule or a copolymer of at least one conjugated diene having from 4 to 12 carbon atoms per molecule and at least one monovinyl-substituted aromatic compound having from 8 to 12 carbon atoms per molecule; and at least one other segment consisting essentially of a polyester polymer of at least one monomer selected from lactones having the formula

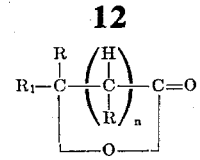

wherein $R_1$ is one of hydrogen and a radical of the formula

when $R_1$ is the specified radical no R is attached to the carbon atom to which the radical is attached; each R is one of hydrogen, a saturated aliphatic, a saturated cycloaliphatic, or an aromatic radical, or combination thereof; n is an integer which can be 1, 3, or 4; and the total number of carbon atoms in the substituents employed, if any, is in the range of 1 to 12.

2. The block copolymer of claim 1 consisting essentially of two segments wherein one segment is a homopolymer block of a conjugated diene having from 4 to 12 carbon atoms per molecule, and the other segment is said polyester polymer attached to one end of the homopolymer block of said conjugated diene.

3. The block copolymer of claim 2 wherein said conjugated diene is at least one of butadiene, isoprene, or piperylene, and R is hydrogen.

4. The block copolymer of claim 3 wherein the conjugated diene is butadiene and the lactone is epsilon-caprolactone.

5. The block copolymer of claim 1 consisting essentially of two segments, the first segment being a copolymer of at least one of said conjugated dienes and at least one of said monovinyl-substituted aromatic compounds, and the second segment being a polyester polymer derived from at least one of said lactones attached to one end of the first segment.

6. The block copolymer of claim 5 wherein said conjugated diene is at least one of butadiene, isoprene, piperylene, said monovinyl-substituted aromatic compound is styrene, and R in the formula is hydrogen.

7. The block copolymer of claim 6 wherein said lactone is epsilon-caprolactone.

8. The block copolymer of claim 1 consisting essentially of three segments, one segment being a polymer of at least one of said conjugated dienes having attached to each end thereof a polyester polymer derived from at least one of said lactones, the two polyester segments being derived from the same lactone monomer or monomers.

9. The block copolymer of claim 8 wherein said conjugated diene is at least one of butadiene, isoprene or piperylene and R in the formula is hydrogen.

10. The block copolymer of claim 9 wherein the first and third segments are polyester polymers derived from the same lactone which is epsilon-caprolactone.

11. The block copolymer of claim 10 wherein said conjugated diene is butadiene.

12. The block copolymer of claim 1 consisting essentially of three segments, the first segment being a polymer of at least one of said monovinyl-substituted aromatic compounds, and having attached to one end thereof a second segment of a polymer of at least one of said conjugated dienes, the polymer segment of said conjugated dienes having also attached thereto a polyester polymer derived from at least one of said lactones.

13. The block copolymer of claim 12 wherein said monovinyl-substituted compound is styrene and said conjugated diene is at least one of butadiene, isoprene, or piperylene.

14. The block copolymer of claim 13 wherein R in the formula is hydrogen.

15. The block copolymer of claim 14 wherein said lactone is epsilon-caprolactone.

16. The block copolymer of claim 12 wherein said monovinyl-substituted aromatic compound is styrene, said conjugated diene is butadiene, and said lactone is epsilon-caprolactone.

17. An article of manufacture made from the block copolymer of claim 1.

18. An article of manufacture made from the block copolymer of claim 5.

19. An article of manufacture made from the block copolymer of claim 8.

20. An article of manufacture made from the block copolymer of claim 12.

21. A film formed of the block copolymer of claim 1.

22. A film formed of the block copolymer of claim 2.

* * * * *